United States Patent [19]
Suzuki

[11] Patent Number: 5,812,834
[45] Date of Patent: Sep. 22, 1998

[54] SINGLE CHIP MICROCOMPUTER HAVING A PLURALITY OF TIMER COUNTERS

[75] Inventor: Kazuhiko Suzuki, Kanagawa, Japan

[73] Assignee: NEC Corporation, Tokyo, Japan

[21] Appl. No.: 607,261

[22] Filed: Feb. 21, 1996

[30] Foreign Application Priority Data

Feb. 21, 1995 [JP] Japan .................................. 7-032484

[51] Int. Cl.⁶ .................................................. G06F 1/04
[52] U.S. Cl. .................................................. 395/557
[58] Field of Search ............................ 395/557; 377/39

[56] References Cited

U.S. PATENT DOCUMENTS

| | | | |
|---|---|---|---|
| 5,157,699 | 10/1992 | Miyazaki et al. | 377/39 X |
| 5,471,608 | 11/1995 | Lee et al. | 395/557 |
| 5,598,555 | 1/1997 | Ito | 395/557 |

*Primary Examiner*—Thomas M. Heckler
*Attorney, Agent, or Firm*—Foley & Lardner

[57] ABSTRACT

In a microcomputer comprising first and second timer counters, an output signal of the first timer counter is supplied through a logic gate to the second timer counter as a clock supply control signal.

4 Claims, 6 Drawing Sheets

SINGLE CHIP MICROCOMPUTER HAVING A PLURALITY OF TIMER COUNTERS

BACKGROUND OF THE INVENTION

1. Field of the Invention

The present invention relates to a microcomputer, and more specifically to a single chip microcomputer including a plurality of timer counters.

2. Description of Related Art

Conventionally, a timer counter internally provided in a single chip microcomputer is used to measure a time or to count input pulses supplied from an external. Each of these measuring and counting operations is executed as if two independent timer counters were provided. In addition, if two timer counters are internally provided in a single chip microcomputer, one of the two timer counters can be used as a time measuring timer, and the other timer counter can be used as a counter for counting the input pulses supplied from the external, so that the time is measured and the external input pulses are counted by using the two timer counters.

Here, as one example of the conventional microcomputer, there will be described a single chip microcomputer internally comprising two timer counters, one of which is used for measuring the time and the other of which is used for counting the external input pulses.

Referring to FIG. 1, there is shown a block diagram illustrating the conventional single chip microcomputer. The shown microcomputer includes a frequency divider 1 receiving a clock $X_1$ through a terminal $T_1$, for supplying internal clocks.Xc, $Xa_1$, $Xa_2$, $Xb_1$, and $Xb_2$, which are obtained by frequency-dividing the clock $X_1$ by predetermined frequency-dividing ratios, respectively, and which are supplied to a CPU (central processing unit) 2 and multiplexors (MPX) 71 and 81, respectively. In synchronism with the internal clock XC, the CPU 2 executes a processing in accordance with a program stored in a program memory composed of a ROM (read only memory) 3. The CPU 2 is also coupled to a bidirectional bus 4 composed of a plurality of bits, a signal line 5 for a write signal W, and another signal line 6 for a read signal R, which are further coupled to two timer counters 7 and 8.

The timer counter 7 includes an operation control circuit 70 composed of a one-bit register and for controlling an operation of a counter 75, the multiplexor 71 mentioned above, a clock selection controller (CLSEL) 72 composed of a two-bit register and for controlling the multiplexor 71 to cause it to select one of the two internal clocks $Xa_1$ and $Xa_2$, a two-input AND gate 73 receiving an output "Xa" of the multiplexor 71 and an output "Da" of the operation control circuit 70, and a two-input OR gate 74 receiving the output "Da" of the operation control circuit 70 and a comparison result output "Ca" of a comparing circuit 77. Furthermore, the counter 75 receives an output "Pa" of the AND gate 73 and is controlled by an output "Ia" of the OR gate 74. An output of the counter 75 is coupled to the bus 4 and to the comparing circuit 77, which compares a current count value "Na" of the counter 75 with a reference value "Ma" set in a reference value setting circuit 76, which is also coupled to the bus 4. The comparing circuit 77 outputs the comparison result "Ca" to the OR gate 74, a flipflop (F/F) 78 and an interrupt flag (INTT) 79, which are controlled by the output "Da" of the operation control circuit 70. An output "Oa" of the flipflop 78 is connected to an output terminal $T_2$. The interrupt flag (INTT) 79 is also connected to receive one bit of the bus 4. An output "INTa" of the interrupt flag (INTT) 79 is connected to the CPU 2.

The timer counter 8 is constructed similarly to the timer counter 7. except that the timer counter 8 additionally includes an input terminal $T_3$ for receiving an external pulse TIb to be measured. Therefore, elements included in the timer counter 8 are given the Reference Numerals obtained by adding "10" to the Reference Numerals given to corresponding elements in the timer counter 7.

The write signal W is brought to a high level "1" at the time of writing data into the operation control circuits 70 and 80, the clock selection controllers 72 and 82, the reference value setting registers 76 and 86, and the interrupt flags 79 and 89. The read signal R is brought to a high level "1" at the time of reading the counters 75 and 85.

Now, operation of the conventional microcomputer shown in FIG. 1 will be described with reference to FIG. 1 as well as FIG. 2 which is a timing chart illustrating the operation of the conventional microcomputer.

First, an address and data are suppled from the CPU through the bus 4 to the timer counter 7 (or 8), and in synchronism with the write signal W on the signal line 5, data is written into the operation control circuit 70 (or 80), the clock selection controller 72 (or 82), the reference value setting register 76 (or 86), and the interrupt flag 79 (or 89) of the timer counter 7 (or 8). In addition, in synchronism with the read signal R on the signal line 6, an address is outputted through the bus 4 to the timer counter 7 (or 8), so that the content of the counter 75 (or 85) is read out. Furthermore, when the interrupt flag 79 (or 89) outputs the interrupt signal INTa (or INTh), the CPU 2 performs an interrupt processing. This interrupt processing is performed in such a manner that the write signal W on the signal line 5 is brought to "1", so that the content of the interrupt flag generating the interrupt signal (namely, the interrupt flag 79 or 89) is cleared through the bus 4, and thereafter, an interrupt processing routine stored in the ROM and corresponding to the generated interrupt signal INTa (or INTh) is executed.

Data "Da" to be written to the operation control circuit 70 is supplied from the CPU 2 through the bus 4, and written into the operation control circuit 70 in synchronism with the write signal W. When the output data "Da" of the operation control circuit 70 is "0", the output of the AND gate 73 is brought to "0", so that the counter 75 does not operate. When the data "Da" is brought to "1", the counter 75 is initialized through the OR gate 74, and the content of the flipflop 78 is brought to "1" and the content of the interrupt flag 79 is brought to "0". At this time, the output Xa of the multiplexor 71 becomes the output Pa of the AND gate 73, so that the counter 75 performs the counting operation in synchronism with a rising of the output pulse Xa of the multiplexor 71. On the other hand, the multiplexor 71 receives the clocks $Xa_1$ and $Xa_2$ supplied from the frequency divider 1, and outputs either the clock $Xa_1$ or $Xa_2$ to the AND gate 73 in accordance with the output of the clock selection controller 72. The writing into the clock selection controller 72 is performed in synchronism with the write signal W of the signal line 5, by supplying data through the bus 4.

Thus, the counter 75 counts up in synchronism with the rising of the count pulse Xa until the count value Na of the counter 75 becomes consistent with the set value Ma of the reference value setting register 76. The count value Na of the counter 75 is ceaselessly supplied to the comparing circuit 77, The counter 75 is initialized by the reset pulse Ia outputted from the OR gate 424 if the output pulse Pa rises up when the data "Da" of "1" is outputted from the operation control circuit 70 or when the comparing circuit 77 outputs the consistency signal Ca. Furthermore, the counter 75 is read by the CPU 2 through the bus 4 in synchronism with the read signal R of the signal line 6.

The reference value setting register 76 is set with an arbitrary value Ma corresponding to a time length to be measured, which is calculated on the basis of the frequency of the clock selected by the clock selection controller 72. This reference value setting register 76 is written by the CPU 2 through the bus 4 in synchronism with the write signal W. The value Ma set in the reference value setting register 76 is ceaselessly supplied to the comparing circuit 77.

This comparing circuit 77 ceaselessly compares the reference value Ma with the count value Na. When the reference value Ma and the count value Na become consistent with each other, the comparing circuit 77 generates the consistency signal Ca of "1", which is supplied to the flipflop 78, the interrupt flag 79 and the OR gate 74 as the control signal in synchronism with the next count pulse Pa.

The flipflop 78 is brought to "1" when the operation control circuit 70 is written with "1" as the data "Da". When the consistency signal Ca outputted from the comparing circuit 77 is of "1", if the count pulse Pa is applied, the output "Oa" a of the flipflop 78 is inverted, and supplied to the output terminal $T_2$.

The interrupt flag 79 is brought to "0" when the operation control circuit 70 is written with "1" as the data "Da". When the consistency signal Ca outputted from the comparing circuit 77 is of "1", if the count pulse Pa is applied, the output INTa of the interrupt flag 79 is brought to "1". The output INTa of the interrupt flag 79 is ceaselessly supplied to the CPU 2, so that when the output INTa becomes "1", the CPU 2 executes the interrupt processing and also clears the content of the interrupt flag 79.

As mentioned above, the timer counter 8 is constructed similarly to the timer counter 7, except that the timer counter 8 additionally includes the input terminal $T_3$ for receiving an external pulse TIb to be measured. Therefore, the multiplexor 81 receives the internal clocks $Xb_1$ and $Xb_2$ and the external pulse TIb to be measured, and selects one of the three clocks in accordance with the set value in the clock selection controller 82. The other operation is the same as that of the timer counter 7, and therefore, a further explanation will be omitted.

Here, for convenience of description, assume that the timer counter 7 is used to measure an arbitrary time, and the tinier counter 8 is used for count an external input pulse. In addition, assume that both of the timer counters 7 and 8 are a 8-bit timer counter.

Next, a counting operation of the conventional microcomputer for counting the external input pulse will be described with reference to FIG. 2. First, an operation mode is set in the timer counters 7 and 8. For the purpose of setting the operation mode in the timer counter 7, the CPU 2 decodes an program (instruction) IP outputted from the ROM 3, and sets data into the clock selection controller 72 and the reference value setting register 76 through the bus 4, respectively, The reference value setting register 76 is set with data "n" as the value Ma corresponding to a time to be measured, which is calculated on the basis of tie frequency of the clock Xa selected by the clock selection controller 72. Here, {time to be measured}={clock repetition period}×(n+ 1). The clock selection controller 72 is set with data which selects either the internal clock $Xa_1$ or $Xa_2$ as a count reference clock for the counter 75.

In order to set the operation mode in the timer counter 8, the CPU 2 similarly decodes the program outputted from the ROM 3, and sets data into the clock selection controller 82 and the reference value setting register 86 through the bus 4, respectively. The reference value setting register 86 is set with a maximum value "FFH" as the value Mb. Here, the suffix "H" indicates a hexadecimal notation. The clock selection controller 82 is set with data which selects the external pulse TIb from the three pulses (namely, the internal clocks $Xb_1$ and $Xb_2$ and the external pulse TIb) as a count reference clock for the counter 85, in this example.

Thus, the timer counter 7 and 8 starts the operation. On the basis of the result of the decoding of the program IP, the CPU 2 sets the data "Db" of the operation control circuit 80 into "1". At this time, the counter 85 is initialized to "00H", the flipflop 88 is brought to "1" and the interrupt flag 89 is brought to "0". Thus, the counter 85 counts up in synchronism with the pulse TIb until the count value Nb becomes consistent with the set value Mb "FFH" in the reference value setting register 86.

Similarly, the CPU 2 sets the data "Da" of the operation control circuit 70 into "1". At this time, the counter 75 is initialized to "00H", the flipflop 78 is brought to "1" and the interrupt flag 79 is brought to "0". Thus, the counter 75 counts up in synchronism with the count pulse Pa until the count value Na becomes consistent with the set value Ma "n" in the reference value setting register 76. In response to the count pulse Pa just after the count value Na becomes the value "n", the counter 75 is cleared so that the count value Na is returned to the initial value "00H". Furthermore, The flipflop 78 is flipped to "0" and the interrupt flag 79 is brought to "1", so that the interrupt occurs. This occurrence of interrupt is notified to the CPU 2, which then, executes the interrupt processing routine for the interrupt signal INTa, which is stored in the ROM 3. In this interrupt processing routine, the CPU reads the count value Nb in the counter 85 under the count-up operation, so that a count value of the external event pulses TIb (="0FH" in the example shown in FIG. 2) is obtained.

Thus, the period of time from the start of the counting operation of the timer counter 7 (as the "time measuring timer") to the occurrence of the interrupt signal INTa, is a time measured, and on the other hand, the timer counter 8 (as the "counting timer") counts the number of the external event pulses until the time measuring timer generates the interrupt.

Referring to FIG. 3, there is shown a block diagram illustrating another example of the conventional single chip microcomputer. In FIG. 3, elements similar or corresponding to those shown in FIG. 1 are given the same Reference Numerals, and explanation thereof will be omitted. As seen from comparison between FIGS. 1 and 3, the second conventional example is different from the first conventional example only in that the second conventional example includes, in place of the timer counter 8, a timer counter 8B having a capture register 91 in addition to the construction of the timer counter 8.

This capture register 91 can be read by the CPU 2 through the bus 4 in synchronism with the read signal R. The capture register 91 fetches the count value Nb of the counter 85 in synchronism with the interrupt request signal INTa generated from the interrupt flag 79.

Next, operation of the second conventional example will be explained. Since the timer counters 7 and 8B of the second conventional example are the same as the timer counters 7 and 8 of the first conventional example excepting for the capture counter 91 of the timer counter 8B, the operation of the second conventional example is the same as that of the first conventional example excepting for the capture register 91. Therefore, only the operation of the second conventional example different from that of the first conventional example will be explained.

When the interrupt flag 79 of the timer counter 7 is brought from "0" to "1", the count value Nb of the counter 85 is fetched and held in the capture register 91. The CPU 2 reads out the value of the capture register 91 in the interrupt processing routine and obtains the count value of the external event pulses TIb (="OBH" in the example shown in FIG. 2).

In the first conventional example as mentioned above, in the case of counting up the external input pulses by one of the internal timer counters, it is necessary to read the count value during the way of the counting operation. Therefore, it is required that the repetition period of the external input pulses is longer than a counter reading instruction cycle. Accordingly, a high speed operation cannot be expected.

In addition, the external input pulse is counted during a period from the moment the pulse counting timer counter starts the counting operation to the moment the time measuring timer counter starts the counting operation, and during a period from the occurrence of the interrupt by the time measuring timer counter to the starting of the reading operation of the count value of the pulse counting timer counter. Accordingly, the obtained count value becomes inaccurate.

On the other hand, the second conventional example can overcome the shortage of the high speed operation, since it includes the capture register. However, there still remains the inaccuracy of the obtained count value caused because the external input pulse is counted during a period from the moment the pulse counting timer counter starts the counting operation to the moment the time measuring timer counter starts the counting operation. Since the second conventional example additionally includes the capture register, the circuit size increases and the cost correspondingly increases.

SUMMARY OF THE INVENTION

Accordingly, it is an object of the present invention to provide a microcomputer including a plurality of timer counters, which has overcome the above mentioned defect of the conventional one.

Another object of the present invention is to provide a microcomputer including a plurality of timer counters, capable of counting an external event pulse having an increased frequency, with minimizing an increase of the circuit size by counting the external event pulse only during a predetermined measuring time.

The above and other objects of the present invention are achieved in accordance with the present invention by a microcomputer comprising first and second timer counters, each of which includes a clock control means receiving a plurality of clock signals having different frequencies for selecting one of the plurality of clock signals, the clock control means being controlled in accordance with a supply control signal so as to control an outputting of the selected clock signal, a count means receiving the selected clock signal for outputting a count value, a reference value setting register for holding a reference value to be compared with the count value of the count means, a comparing means receiving the count value of the count means and the reference value of the reference value setting register, for generating a consistency signal when the count value of the count means becomes consistent with the reference value, and an output hold means for holding an output signal flipped in response to the consistency signal, wherein the improvement comprises a control signal input means provided in the second timer counter, for supplying the output signal of the first timer counter to the clock control means of the second timer counter as the supply control signal.

The above and other objects, features and advantages of the present invention will be apparent from the following description of preferred embodiments of the invention with reference to the accompanying drawings.

DESCRIPTION OF THE PREFERRED EMBODIMENTS

Figure 1:
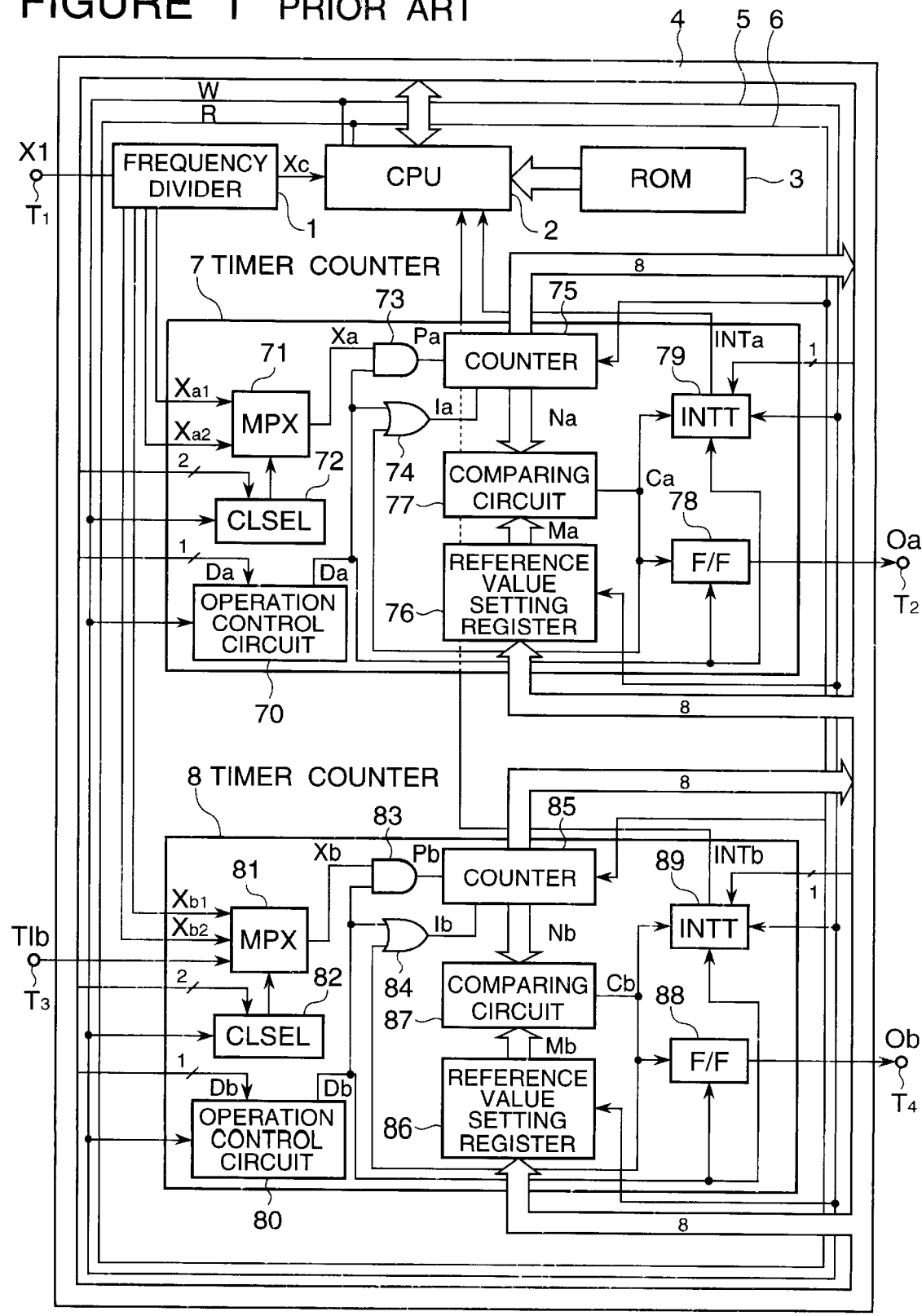
FIG. 1 is a block diagram illustrating a first example of the conventional single chip microcomputer.
Figure 2:
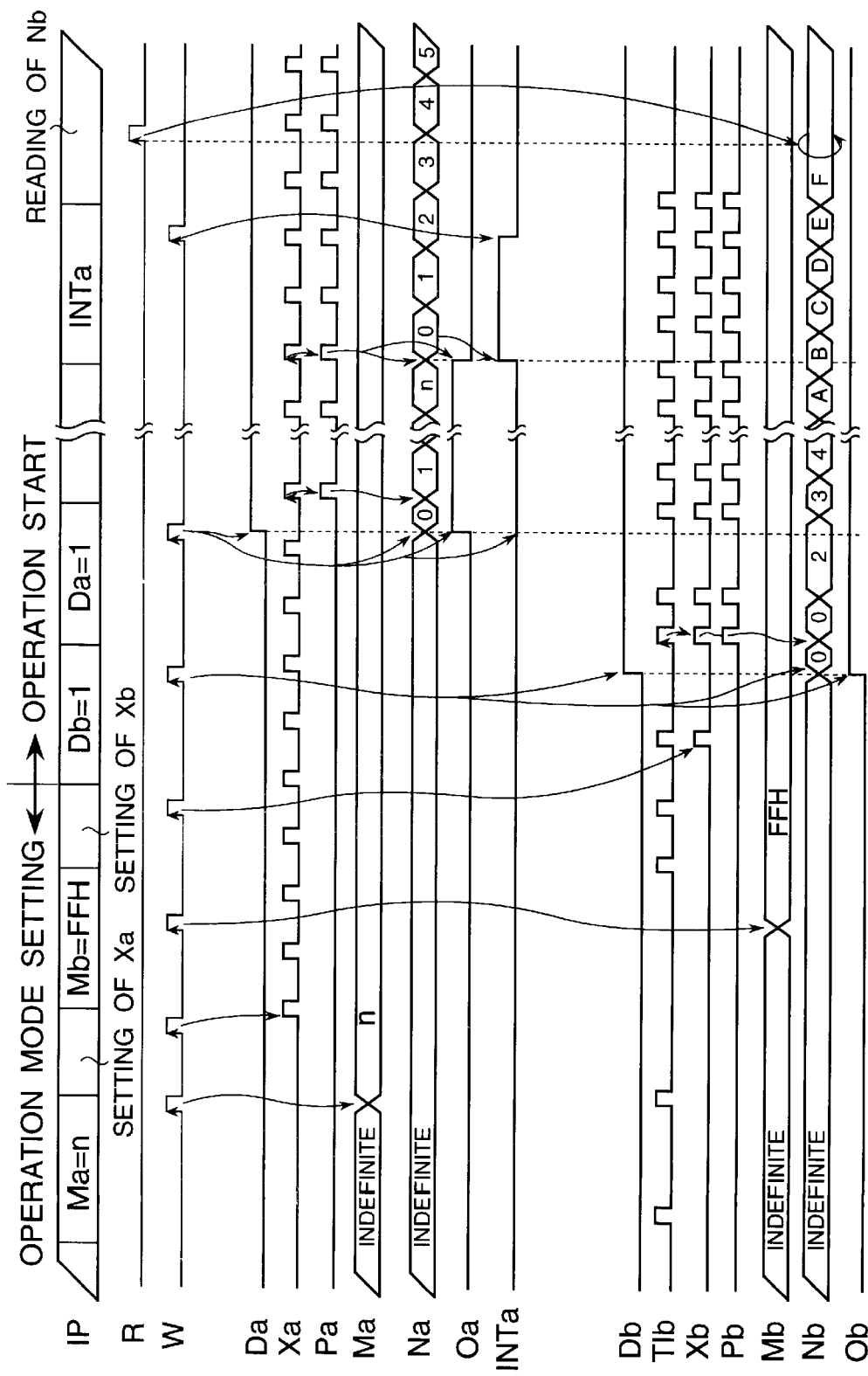
FIG. 2 is a timing chart illustrating the operation of the conventional single chip microcomputer.
Figure 3:
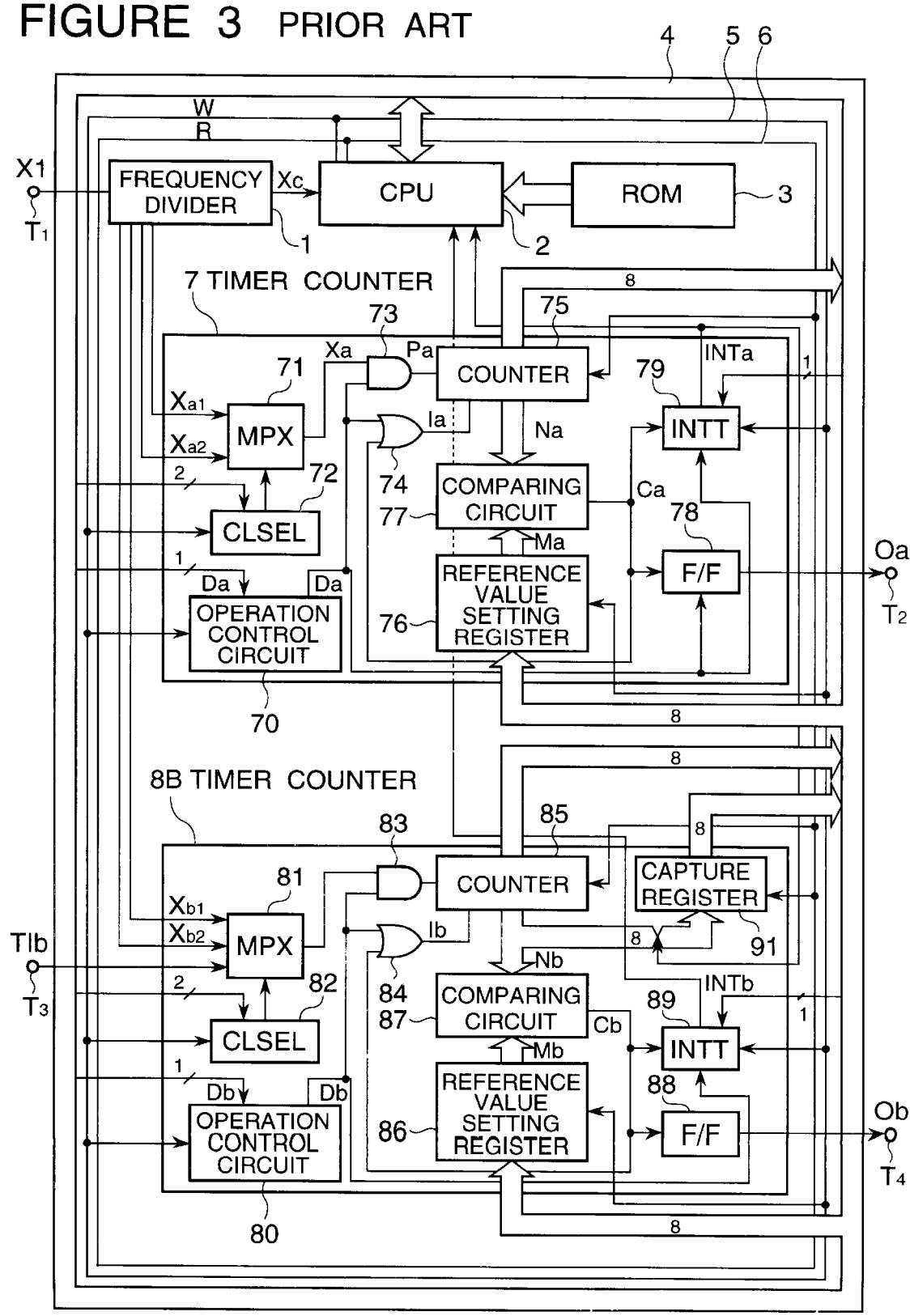
FIG. 3 is a block diagram illustrating a second example of the conventional single chip microcomputer.
Figure 4:
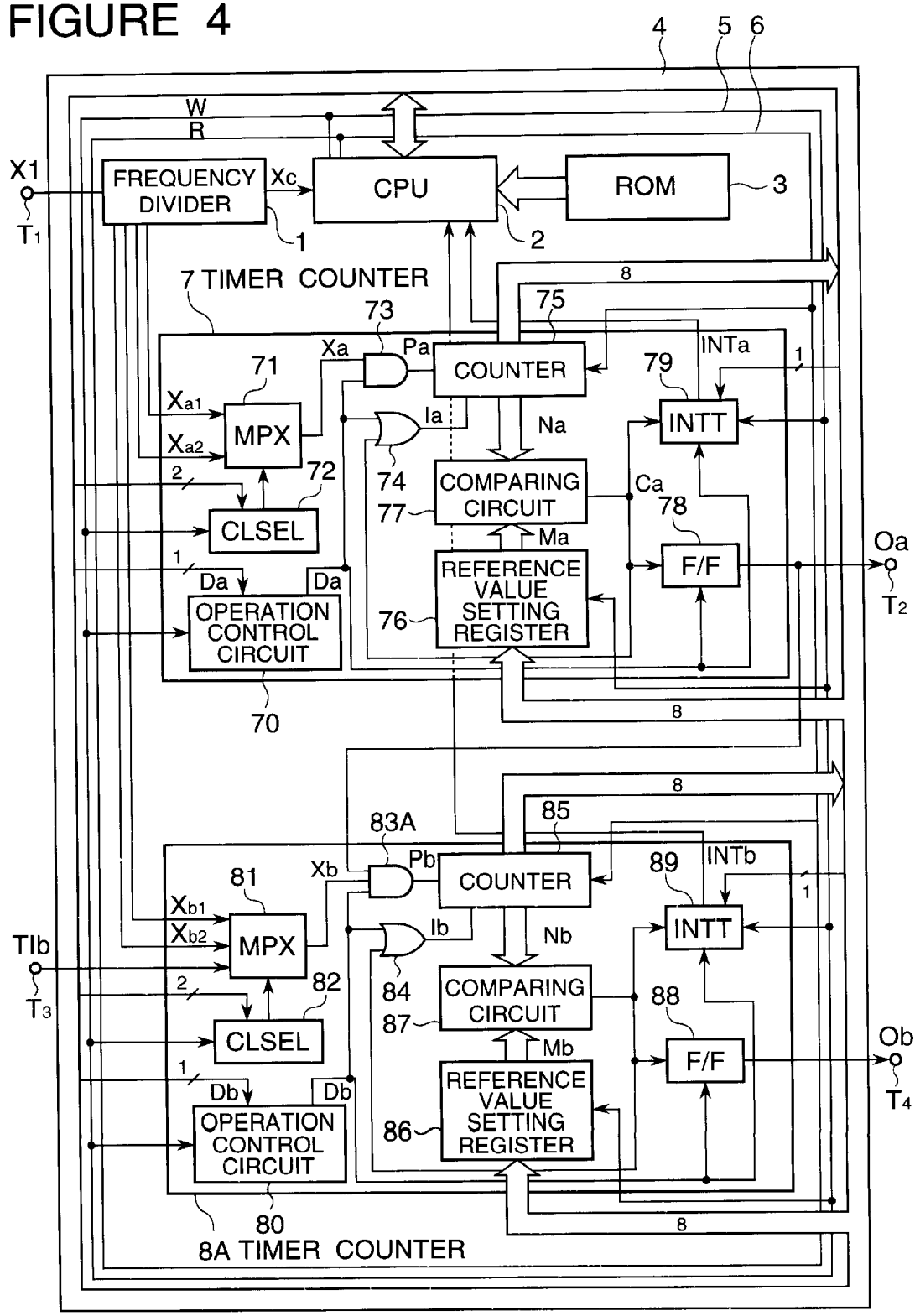
FIG. 4 is a block diagram illustrating a first embodiment of the single chip microcomputer in accordance with the present invention.

Referring to FIG. 4, there is shown a block diagram illustrating a first embodiment of the single chip microcomputer in accordance with the present invention. In FIG. 4, elements similar or corresponding to those shown in FIG. 1 are given the same Reference Numerals, and explanation thereof will be omitted. As seen from comparison between FIGS. 1 and 4, the first embodiment of the single chip microcomputer includes the frequency divider 1, the CPU 2, the ROM 3, the bus 4, the signal lines 5 and 6, and the timer counter 7, similarly to the first conventional example, and also includes, in place of the timer counter 8 of the first conventional example, a timer counter 8A having a three-input AND gate 83A. This AND gate 83 receives the output signal "Oa" of the output terminal $T_2$, in addition to the output Xb of the multiplexor 81 and the data "Db" of the operation control circuit 80.

Now, operation of the first embodiment will be described with reference to FIG. 4. If "1" is written in the operation control circuit 70 as the data "Da", the flipflop 78 is set to "1". When the consistency signal "Ca" of the comparing circuit 77 is of "1", if the next count pulse Pa is supplied, the output of the flipflop 78 is flipped. This output of the flipflop 78 is supplied to the output terminal $T_2$ and also to the AND gate 83A of the timer counter 8A.

This AND gate 83A receives the output "Oa" of the flipflop 78 and the output Xb of the multiplexor 81 and the data "Db" of the operation control circuit 80, and outputs the result of the AND logic operation to the counter 85 as the count pulse Pb.

Figure 5:
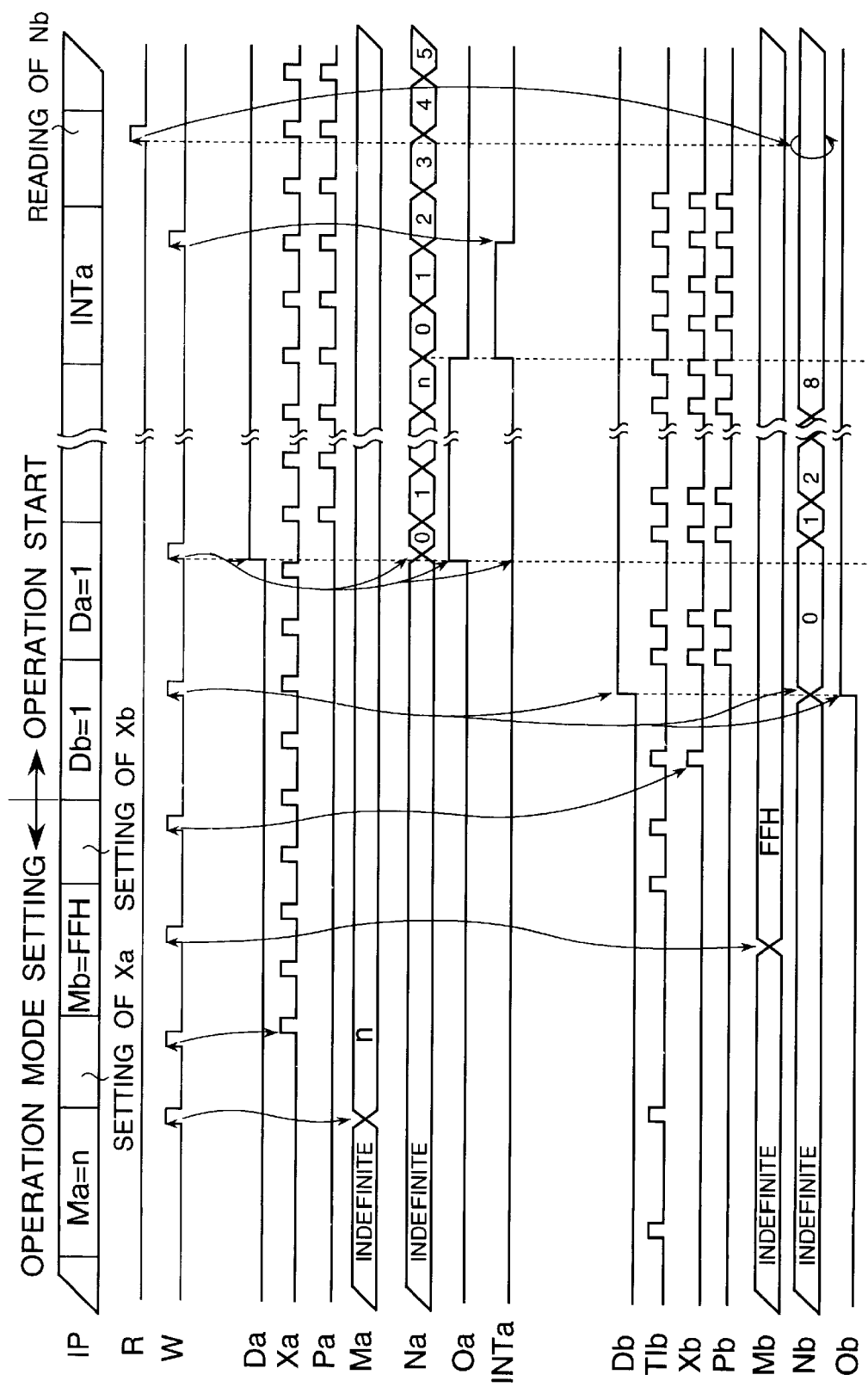
FIG. 5 is a timing chart illustrating the operation of the first embodiment of the single chip microcomputer in accordance with the present invention.

Now, an external event pulse counting operation of the first embodiment will be explained with reference to FIG. 5, assuming that the timer counter 7 is used as a time measuring timer counter, and the timer counter 8A is used as a pulse counting timer counter, similarly to the conventional examples as mentioned hereinbefore.

First, an operation mode is set in the timer counters 7 and 8A, similarly to the conventional examples. In accordance with an program (instruction) IP outputted from the ROM 3, the CPU 2 sets "1" into the operation control circuit 70 through the bus 4 as the data "Da" in synchronism with the write signal W. At this time, the counter 75 is initialized to "00H", and the flipflop 78 and the interrupt flag 79 are brought to "1" and "0", respectively. At this time, furthermore, since the third input "Oa" of the AND gate 83A of the timer counter 8A becomes "1", the counter 85 counts up in synchronism with the pulse TIb until the count value Nb becomes consistent with the set value Mb "FFH" in the reference value setting register 86.

After "1" is set as the data "Da", the counter 75 counts up in synchronism with the count pulse Pa until the count value Na becomes consistent with the set value Ma "n" in the reference value setting register 76. In response to a rising of the count pulse Pa just after the count value Na has become the value "n", the counter 75 is initialized to "00H". Furthermore, the flipflop 78 is flipped to "0" and the interrupt flag 79 is brought to "1", so that the interrupt occurs. As a result, since the third input "Oa" of the AND gate 83A of the timer counter 8A becomes "0", the counter 85 no longer counts up even if the external event pulse TIb is supplied. The occurrence of interrupt is notified from the interrupt flag 79 to the CPU 2, which then, clears the interrupt flag 79 and executes the interrupt processing routine for the interrupt signal INTa. In this interrupt processing routine, the CPU reads the count value Nb in the counter 85, so that a count value of the external event pulses TIb (="08H" as shown in FIG. 5 for example) is obtained.

As seen from the above, the time measuring period is the period of "1" of the output "Oa" of the flipflop 78 which starts from the moment the timer counter 7 starts its operation and which terminates at the occurrence of the interrupt signal INTa. Only during this period of "1" of the output "Oa" of the flipflop 78, the timer counter 8 counts the external event pulse TIb.

Figure 6:
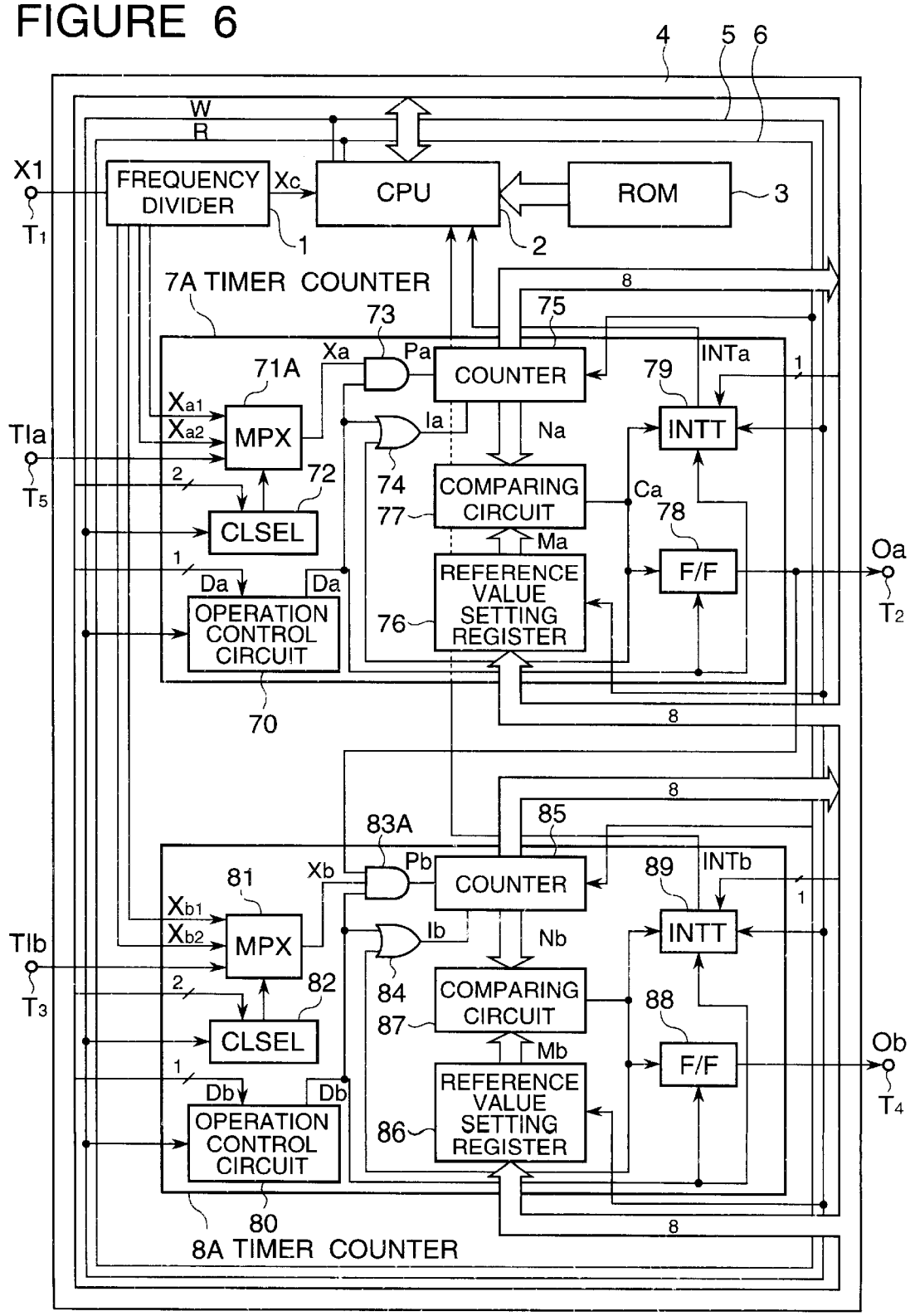
FIG. 6 is a block diagram illustrating a second embodiment of the single chip microcomputer in accordance with the present invention.

Referring to FIG. 6, there is shown a block diagram illustrating second embodiment of the single chip microcomputer in accordance with the present invention. In FIG. 6, elements similar or corresponding to those shown in FIG. 4 are given the same Reference Numerals, and explanation thereof will be omitted. As seen from comparison between FIGS. 4 and 6, the second embodiment is different from the first embodiment only in that the second embodiment includes, in place of the timer counter 7, a timer counter 7A having a three-input multiplexor 71A receiving an external clock TIa from an input terminal $T_5$.

Similarly to the multiplexor 81 of the timer counter 8A of the first embodiment, the multiplexor 71A receives the internal clocks $Xa_1$ and $Xa_2$ and the external clock TIa, and is controlled by the clock selection controller 72 so as to select and output one of the three clocks to the AND gate 73.

When the timer counter 7A used as the time measuring timer is controlled so that the external clock TIa is selected by the multiplexor 71A as the output pulse Xa under the control of the clock selection controller 72, it is possible to supply a count pulse generated by a clock source of an external microcomputer, and therefore, the width of selection of the time measurement can be enlarged.

Therefore, the second embodiment has the same advantage as that obtained in the first embodiment and also a second advantage capable of enlarging the width of selection of the time measurement in the time measuring timer.

As seen from the above, by supplying the output signal of the time measuring timer counter through an input control means to the pulse counting timer counter as a clock supply control signal, the microcomputer in accordance with the present invention makes it unnecessary to read the count value in the way of the counting operation when the pulse counting timer counter counts an external pulse. Therefore, it is possible to elevate the frequency of the external pulse, so that a high speed operation can be realized.

Furthermore, it is possible to avoid to count the external input pulse during the period from the moment the pulse counting timer counter starts the counting operation to the moment the time measuring timer counter starts the counting operation, and during the period from the occurrence of the interrupt by the time measuring timer counter to the starting of the reading operation of the count value of the pulse counting timer counter. Accordingly, an accurate count value can be obtained.

In addition, since an additional circuit such as the capture register is not necessary, the circuit scale and the cost do not increase substantially.

The invention has thus been shown and described with reference to the specific embodiments. However, it should be noted that the present invention is in no way limited to the details of the illustrated structures but changes and modifications may be made within the scope of the appended claims.

I claim:

1. A microcomputer comprising first and second timer counters, each of which includes a clock control means receiving a plurality of clock signals having different frequencies for selecting one of said plurality of clock signals, said clock control means being controlled in accordance with a supply control signal so as to control an outputting of the selected clock signal, a count means receiving said selected clock signal for outputting a count value, a reference value setting register for holding a reference value to be compared with said count value of said count means, a comparing means receiving said count value of said count means and said reference value of said reference value setting register, for generating a consistency signal when said count value of said count means becomes equal to said reference value, and on output hold means for holding an output signal inverted in response to said consistency signal, wherein the improvement comprises a control signal input means provided in said second timer counter, for supplying said output signal of said first timer counter to said clock control means of said second timer counter so that said outputting of the selected clock signal is controlled by said clock control means on the basis of said supply control signal and said output signal of said first timer counter.

2. A microcomputer claimed in claim 1 wherein said first timer counter is used as a time measuring timer for measuring a time period from a start of said outputting of said supply control signal to occurrence of said consistency signal, for generating a time width signal based on said time period, and said second timer counter is used as a pulse counting counter for counting an external pulse to be counted, supplied from an external signal source, during said time width signal, and wherein said control signal input means of said second timer counter includes a logic circuit for receiving said output signal of said first timer counter, an output of said logic circuit being connected to said count means of said second timer counter for controlling a counting operation of said count means of said second timer counter.

3. A microcomputer claimed in claim 2 wherein said clock control means of said second timer counter includes an external clock input terminal receiving, as one of said plurality of clock signals, said external pulse supplied from said external signal source.

4. A microcomputer claimed in claim 2 wherein said clock control means of said first timer counter includes an external clock input terminal receiving, as one of said plurality of clock signals, an external pulse supplied from an external signal source.

* * * * *